United States Patent
Yamazaki

(10) Patent No.: US 11,774,413 B2
(45) Date of Patent: Oct. 3, 2023

(54) PREPARATIVE LIQUID CHROMATOGRAPH

(71) Applicant: Shimadzu Corporation, Kyoto (JP)

(72) Inventor: Tomoyuki Yamazaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/366,467

(22) Filed: Jul. 2, 2021

(65) Prior Publication Data

US 2021/0333244 A1 Oct. 28, 2021

Related U.S. Application Data

(63) Continuation of application No. 16/490,658, filed as application No. PCT/JP2017/010650 on Mar. 16, 2017, now abandoned.

(51) Int. Cl.
| | |
|---|---|
| *B01D 15/20* | (2006.01) |
| *B01D 15/22* | (2006.01) |
| *G01N 30/04* | (2006.01) |
| *G01N 30/80* | (2006.01) |
| *G01N 30/84* | (2006.01) |
| *G01N 30/26* | (2006.01) |
| *G01N 30/82* | (2006.01) |
| *G01N 30/06* | (2006.01) |

(52) U.S. Cl.
CPC .............. *G01N 30/04* (2013.01); *B01D 15/20* (2013.01); *B01D 15/22* (2013.01); *G01N 30/06* (2013.01); *G01N 30/26* (2013.01); *G01N 30/80* (2013.01); *G01N 30/82* (2013.01); *G01N 30/84* (2013.01)

(58) Field of Classification Search
CPC ........ B01D 15/22; G01N 30/04; G01N 30/06; G01N 30/26; G01N 30/80; G01N 30/82; G01N 30/84
See application file for complete search history.

(56) References Cited

U.S. PATENT DOCUMENTS

| | | | |
|---|---|---|---|
| 2002/0088946 A1* | 7/2002 | Hofmann | G01N 30/84 250/489 |
| 2010/0276350 A1 | 11/2010 | Kono et al. | |
| 2010/0281958 A1 | 11/2010 | Kono et al. | |

FOREIGN PATENT DOCUMENTS

| | | |
|---|---|---|
| JP | 2002-005914 A | 1/2002 |
| JP | 2003149217 A * | 5/2003 |

(Continued)

OTHER PUBLICATIONS

Machine translation of JP-2003149217, Translated Jul. 17, 2020.*

(Continued)

*Primary Examiner* — Benjamin L Lebron
(74) *Attorney, Agent, or Firm* — Maier & Maier, PLLC

(57) ABSTRACT

A preparative liquid chromatograph includes a liquid chromatograph section, a trap section, an eluent supply section, a collector, and a flow path switching section. The flow path switching section is configured to be selectively switched to a component trap mode that connects the liquid chromatograph section and the trap section in such a way that a sample component separated in a separation column is trapped by a trap column of the trap section; and a collection mode that connects the eluent supply section and the trap section and connects the trap section and the collector in such a way that the components trapped in the trap column are eluted by an eluent from the eluent supply section and are guided to the collector.

2 Claims, 6 Drawing Sheets

(56) References Cited

FOREIGN PATENT DOCUMENTS

| JP | 2003149217 A | 5/2003 |
|---|---|---|
| WO | 2009/044426 A1 | 4/2009 |
| WO | 2009/044427 A1 | 4/2009 |

OTHER PUBLICATIONS

Office Action dated Sep. 13, 2021, in connection with corresponding Chinese Application No. 201780087634.7 (13 pp., including machine-generated English translation).
Indian Office Action dated May 20, 2021, in connection with corresponding IN Application No. 201947040866; 7 pages.
Office Action dated Feb. 15, 2022 in Chinese Patent Application No. 201780087634.7 (with English translation); 13 pages.
Translation of International Search Report and Written Opinion dated Jun. 6, 2017 of corresponding application No. PCT/JP2017/010650; 7 pages.
Office Action dated Feb. 20, 2021 in corresponding Chinese Application No. 201780087634.7; 14 pages.

\* cited by examiner

PREPARATIVE LIQUID CHROMATOGRAPH

CROSS-REFERENCE TO RELATED APPLICATIONS

This application is a continuation of U.S. patent application Ser. No. 16/490,658, filed Sep. 3, 2019, which claims priority to International Application No. PCT/JP2017/010650, filed Mar. 16, 2017, the entire contents of which are incorporated herein by reference.

FIELD

The present invention relates to a preparative liquid chromatograph that separates a sample into every component by using a separation column and fractionates and collects the separated sample components.

BACKGROUND

A preparative liquid chromatograph, which separates a sample into every component by using a separation column and fractionates and collects the separated sample components, is known (see Patent Document 1). The preparative liquid chromatograph includes: a liquid chromatograph section that has a separation column and a detector; and a collector that fractionates and collects a solution (mobile phase) containing the components separated in a liquid chromatograph section, in which the operation of the collector is controlled based on a detection signal of the detector in such a way that a solution containing a desired sample components is fractionated and collected.

Patent Document 1: Japanese Patent Laid-open Publication No. 2002-005914

SUMMARY

In a high-performance liquid chromatograph, TFA (Trifluoroacetic acid) or the like may be added to a mobile phase to improve a separation ability by a separation column. However, for example, in a pharmaceutical field where medicines are produced by concentrating and powdering solutions each containing a target component that has been fractionated and collected in a collection container, it is not preferable that a mobile phase derived components such as TFA remains in a produced medicine, and hence it is necessary to perform the work of removing such a mobile phase derived components at the stage of concentrating and powdering the solution that has been fractionated and collected.

Further, when the same samples are injected multiple times, into an analysis flow path of a liquid chromatograph to fractionate and collect sample components, solutions, even if each of which contains the same sample component, are fractionated and collected in separate collection containers in a conventional preparative liquid chromatograph. Therefore, it is necessary for a user to perform the work of combining the same sample component into a common container by hand after all the fraction collection operations are completed.

In the configuration of the conventional preparative liquid chromatograph, up to the process of fractionating and collecting a solution containing a desired sample component in a collection container can be performed automatically, but the subsequent processes cannot be performed automatically. Therefore, the work of removing a mobile phase derived components from the solution containing a sample component cannot be performed online and automatically.

Therefore, an object of the present invention is to provide a preparative liquid chromatograph that has a configuration in which the subsequent processes, to be performed on a solution containing a sample component separated by a separation column, can be performed online.

A preparative liquid chromatograph according to the present invention includes: a liquid chromatograph section comprising a sample injection part, a separation column, and a detector, wherein the liquid chromatograph section is configured in such a way that a sample injected by the sample injection part is separated into components in the separation column, and the separated components are detected by the detector; a trap section that that includes one or more trap columns and is configured in such a way that the components separated in the separation column are trapped by the trap columns; an eluent supply section for supplying an eluent for eluting the components trapped in the trap columns from the trap columns; a collector for collecting an eluate from the trap columns; and a flow path switching section configured to be selectively switched to a component trap mode and a collection mode, wherein the component trap mode is a mode where the liquid chromatograph section and the trap section are connected to each other in such a way that the components separated in the separation column are trapped by the trap columns, and wherein the collection mode is a mode where the eluent supply section and the trap section are connected to each other, and the trap section and the collector are connected to each other in such a way that the components trapped in the trap columns are eluted from the trap columns by the eluent supplied by the eluent supply section and are led to the collector.

That is, the preparative liquid chromatograph according to the present invention is configured in such a way that: the components separated in the liquid chromatograph section are temporarily trapped by the trap columns of the trap section; and the components trapped in the trap columns are subsequently eluted and collected by the collector. Since the components separated in the liquid chromatograph section are temporarily trapped in the trap columns, various processes can be performed on a solution containing the components trapped in the trap columns before the solutions containing the components are collected in a collection container.

In the present invention, it is preferable that the trap section includes a plurality of the trap columns, and the collector is configured to fractionate and collect the eluate from each trap column. Thereby, a plurality of the components separated in the liquid chromatograph section can be trapped individually in the trap columns, and the components trapped in each trap column can be collected individually.

In a preferred embodiment of the preparative liquid chromatograph according to the present invention, the preparative liquid chromatograph further includes a purifying liquid supply section that supplies a purifying liquid for purifying the components trapped in the trap columns. In this case, the flow path switching section is configured to be switched also to a purification mode. The purification mode is a mode where the purifying liquid supply section and the trap section are connected to each other in such a way that the components trapped in the trap columns are purified by the purifying liquid supplied by the purifying liquid supply section. With such a configuration, the process of removing unnecessary components, such as mobile phase derived components such as TFA, from the solution containing the components temporarily trapped in the trap columns can be performed online.

In the present invention, the "purification" means that unnecessary components in the solution containing the components trapped in the trap columns are removed. The "unnecessary components" are mobile phase derived components such as, for example, TFA. That is, a liquid, having the property of removing the mobile phase derived components in the trap columns, can be used as the purifying liquid. When the mobile phase derived components include, for example, TFA, ammonia water or the like can be used as the purifying liquid.

It is preferable that the preparative liquid chromatograph according to the present invention includes: a component trap program that is configured to perform a component trap operation for trapping, in the trap columns, desired components separated in the separation column, by a control section, which controls the operations of the liquid chromatograph section, the trap section, the eluent supply section, the collector, and the flow path switching section, switching the flow path switching section to the component trap mode and by controlling the operation of the trap section based on a detection signal of the detector; a purification program that is configured to perform, after the component trap operation, a purification operation for purifying the components trapped in the trap columns with the purifying liquid from the purifying liquid supply section, by switching the flow path switching section to the purification mode; and a collection program that is configured to perform, after the purification operation, a collection operation for eluting the components trapped in the trap columns with the eluent from the eluent supply section so as to collect the eluted components by the collector, by switching the flow path switching section to the collection mode. Thereby, operations, including the above component trap operation, purification operation, and collection operation, can be performed automatically.

Further, in a conventional preparative liquid chromatograph, when analyses of the same sample are performed multiple times in a liquid chromatograph section, solutions containing the same sample components are collected in a plurality of collection containers, as described above, and hence it is necessary for a user to perform the work of combining the solutions containing the components collected in those collection containers into one collection container.

To make such work by a user unnecessary, the preparative liquid chromatograph of the present invention may further include a collective trap program that is configured in such a way that when analyses of the same sample are performed multiple times in the liquid chromatograph section, the control section, which controls the operations of the liquid chromatograph section, the trap section, the eluent supply section, the collector, and the flow path switching section, controls the operation of the trap section so as to collectively collect the same components separated in the separation columns in a common trap column. With the above configuration, when analyses of the same sample are performed multiple times in the liquid chromatograph section, the same component separated in each analysis is trapped in the common trap column, and the same sample component can be collected in one collection container in the subsequent elution step.

The preparative liquid chromatograph according to the present invention is configured in such a way that: the components separated in the liquid chromatograph section are temporarily trapped by the trap columns of the trap section; and thereafter, the components trapped in the trap columns are eluted and collected by the collector, and hence, various processes, such as purification of the components, can be performed online on the solution containing the components trapped in the trap columns.

When the solution collected in the collection container contains much water-based solvent, the subsequent drying step will take a long time, but in the present invention, the components trapped in the trap columns are eluted with an eluent containing much organic solvent whose boiling point is lower than water and are collected in the collection container, and hence, drying of the solution collected in the collection container becomes easy.

DETAILED DESCRIPTION

Hereinafter, one embodiment of a preparative liquid chromatograph of the present invention will be described with reference to the drawings.

Figure 1:
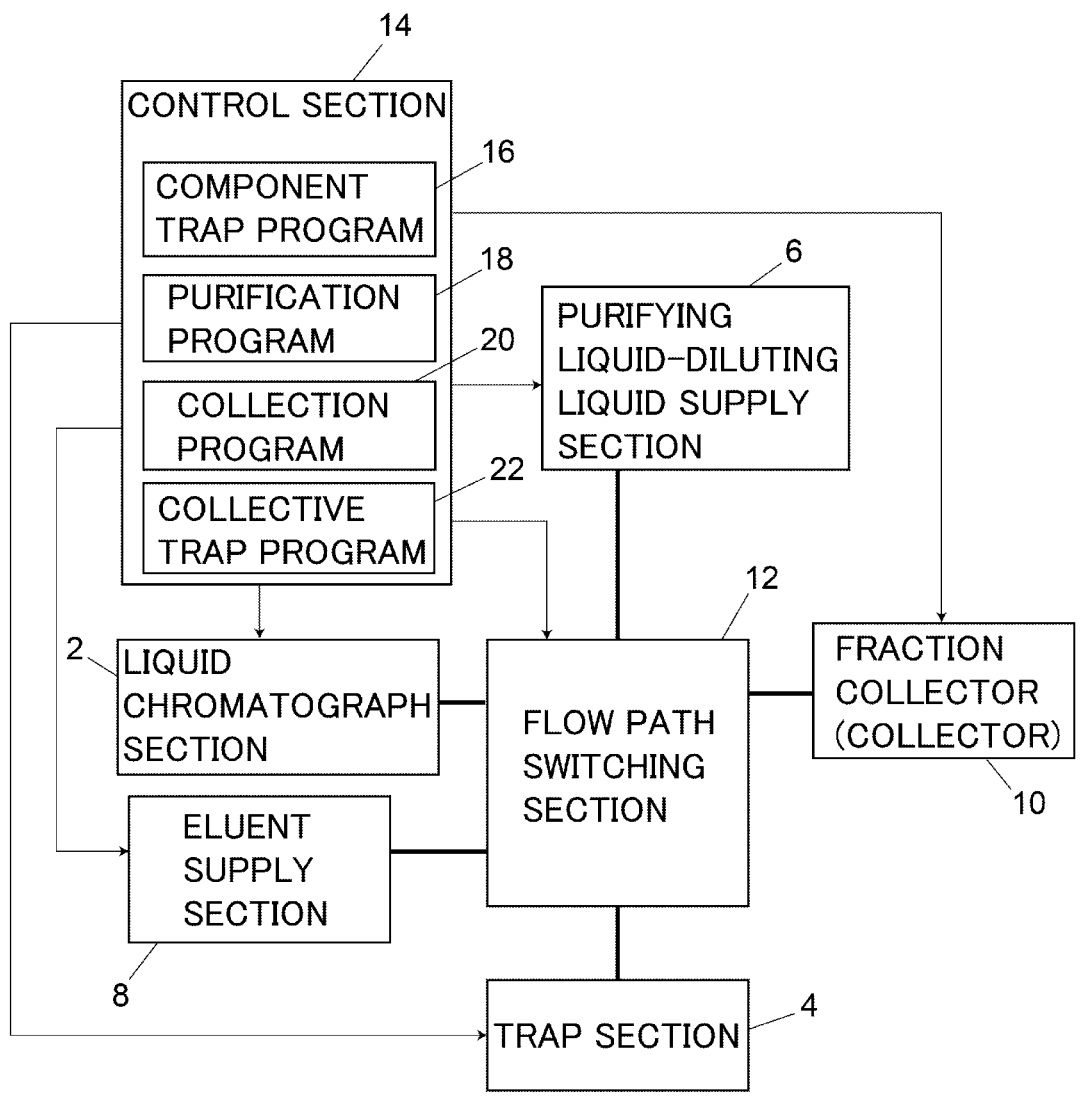
FIG. 1 is a block diagram schematically illustrating one embodiment of a preparative liquid chromatograph.

First, a schematic configuration of the entire preparative liquid chromatograph of the embodiment will be described with reference to FIG. 1.

The preparative liquid chromatograph of the embodiment includes a liquid chromatograph section 2, a trap section 4, a purifying liquid-diluting liquid supply section 6, an eluent supply section 8, a fraction collector 10 (collector), a flow path switching section 12, and a control section 14.

The liquid chromatograph section 2 has a sample injection part 30, a separation column 32, and a detector 34 (see FIG. 2), and is configured in such a way that a sample injected by the sample injection part 30 is separated into components in the separation column 32 and the separated components are detected by the detector 34.

The trap section 4 includes one or more trap columns (see FIG. 2), so that a solution containing desired components separated in the liquid chromatograph section 2 are trapped in the trap columns 45.

The purifying liquid-diluting liquid supply section 6 is configured to supply a purifying liquid and a diluting liquid as needed. The purifying liquid is a liquid for removing an unnecessary component from the solution containing the components trapped in trap columns 45 (see FIG. 2) of the trap section 4. The diluting liquid is a liquid for adjusting the force of trapping the components in the trap columns 45 of the trap section 4 by adjusting the composition of the solution containing the components separated in the liquid chromatograph section 2. In the embodiment, the purifying liquid-diluting liquid supply section 6 combines a function as a purifying liquid supply section that supplies a purifying liquid and a function as a diluting liquid supply section that supplies a diluting liquid, but the purifying liquid supply section and the diluting liquid supply section may be provided separately.

The eluent supply section 8 is configured to supply, as needed, an eluent for eluting the components trapped in the trap columns 45 (see FIG. 2) of the trap section 4.

The fraction collector 10 is configured to fractionate and collect the components eluted from the trap columns 45 of the trap section 4.

The liquid chromatograph section 2, the trap section 4, the purifying liquid-diluting liquid supply section 6, the eluent supply section 8, and the fraction collector 10 are each connected to the flow path switching section 12, and they are configured in such a way that the connection state between each of them is switched by the flow path switching section 12. The flow path switching section 12 mainly has three modes: a component trap mode, a purification mode, and a collection mode.

The component trap mode is a mode where the liquid chromatograph section 2 and the trap sections 4 are connected to each other in such a way that the solutions containing the components separated in the liquid chromatograph section 2 are trapped by the trap columns 45 (see FIG. 2) of the trap section 4. Further, in the component trap mode, the purifying liquid-diluting liquid supply section 6 and the trap section 4 are connected to each other in such a way that a diluting liquid from the purifying liquid-diluting liquid supply section 6 is supplied, as needed, to the solution flowing into the trap columns 45 of the trap section 4 from the liquid chromatograph section 2.

The purification mode is a mode where the purifying liquid-diluting liquid supply section 6 and the trap section are connected to each other in such a way that the components are purified by a purifying liquid flowing through the trap columns 45 (see FIG. 2) that trap the solutions containing the components separated in the liquid chromatograph section 2. The flow path configuration at the time of the purification mode may be the same as that at the time of the above component trap mode. In the specific flow path configurations of the embodiment that will be described later with reference to FIGS. 4 to 6, the flow path configuration (see FIG. 4) in the component trap mode and the flow path configuration (see FIG. 5) in the purification mode are actually the same.

Figure 2:
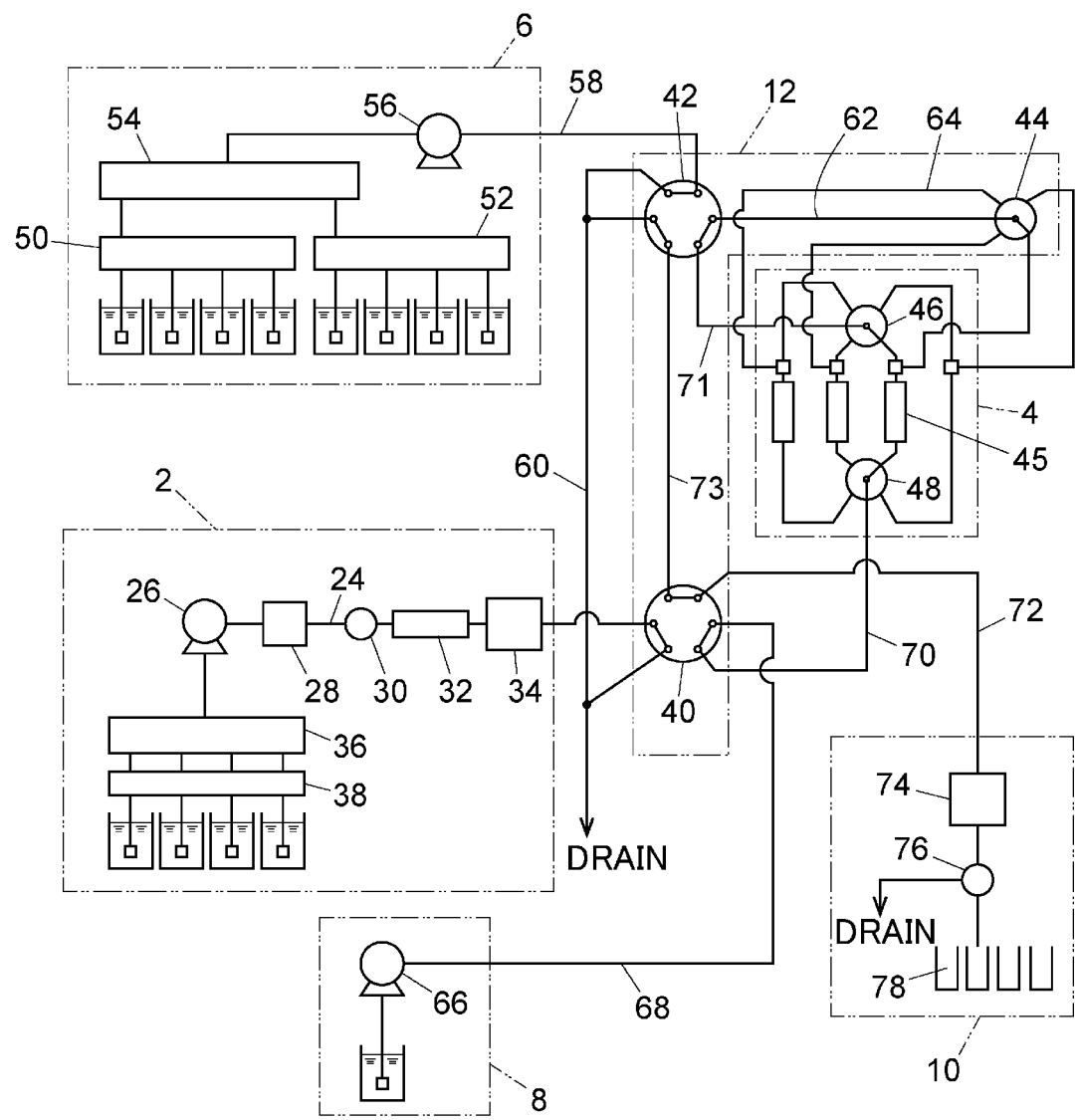
FIG. 2 is a flow path configuration diagram illustrating one example of a specific flow path configuration of the embodiment.

The collection mode is a mode where the eluent supply section 8 and the trap sections 4 are connected to each other, and the trap section 4 and the fraction collector 10 are connected to each other in such a way that the components eluted from the trap columns 45 are fractionated and collected by the fraction collector 10 with the eluent from the eluent supply section 8 flowing through the trap columns 45 (see FIG. 2).

The control section 14 controls the operations of the liquid chromatograph section 2, the trap section 4, the purifying liquid-diluting liquid supply section 6, the eluent supply section 8, the fraction collector 10, and the flow path switching section 12. The control section 14 includes a component trap program 16, a purification program 18, a collection program 20, and a collective trap program 22, so that the following functions can be obtained by an arithmetic element provided in the control section 14 executing each program.

The component trap program 16 is configured to perform a component trap operation in which a solution containing the desired components separated in the liquid chromatograph section 2 are trapped in the trap columns 45 (see FIG. 2) of the trap section 4 by switching the flow path switching section 12 to the component trap mode and by controlling the operation of the trap section 4 based on a detection signal of the detector 34 (see FIG. 2) of the liquid chromatograph section 2. That is, the component trap operation is performed by the arithmetic element executing the component trap program 16. The component trap program 16 is also configured to supply a diluting liquid to the solution to be introduced into the trap columns 45 by operating the purifying liquid-diluting liquid supply section 6, as needed.

The purification program 18 is configured to perform a purification operation in which components are purified by switching the flow path switching section 12 to the purification mode and by making the purifying liquid-diluting liquid supply section 6 supply a purifying liquid to the trap columns 45 that has trapped the components. That is, the purification operation is performed by the arithmetic element executing the purification program 18.

The collection program 20 is configured to perform a collection operation in which by switching the flow path switching valve 12 to the collection mode, components are eluted by making the eluent supply section 8 supply an eluent to the trap columns 45 that trapped the components and the eluted components are fractionated and collected by the fraction collector 10. That is, the collection operation is performed by the arithmetic element executing the collection program 20.

The collective trap program 22 is configured to control the operation of the trap section 4 in such a way that when analyses are performed with the same samples injected multiple times into the liquid chromatograph section 2, the same components separated in each analysis are trapped in the common trap column 45 (see FIG. 2) of the trap section 4.

One example of the specific flow path configuration of the embodiment will be described with reference to FIG. 2.

The liquid chromatograph section 2 includes an analysis flow path 24. The sample injection part 30, the separation column 32, and the detector 34 are provided on the analysis flow path 24. A liquid feed pump 26 is provided in the analysis flow path 24, so that after the solvent pumped up by the liquid feed pump 26 is degassed by a degas ser 38, the solvent is mixed by a mixer 28 and is fed through the analysis flow path 24 as a mobile phase. The composition of the mobile phase flowing through the analysis flow path 24 is adjusted by a switching solvent selection valve 36. The downstream end of the analysis flow path 24 is connected to one port of the flow path switching valve 40.

The trap section 4 includes a plurality of the trap columns 45 and the switching valves 46 and 48 for selectively switching to the trap column 45 to be used. Each of the switching valves 46 and 48 includes a common port at its center and a plurality of selection ports around it, and is configured to selectively switch to the selection port to be connected to the common port. A flow path leading to each trap column 45 is connected to the selection port of each of the switching valves 46 and 48. Each of one end and the other end of a flow path in which the trap column 45 is not provided is connected to one selection port of the switching valve 46 and one selection port of the switching valve 48, respectively. The common port of the switching valve 46 is connected to one port of the flow path switching valve 42.

The purifying liquid-diluting liquid supply section 6 is configured to supply a desired purifying liquid or diluting liquid through a purifying liquid-diluting liquid supply flow path 58 by the liquid feed pump 56. It is configured that the type of the purifying liquid or diluting liquid to be fed by the liquid feed pump 56 is selectively switched by the selection valves 50, 52, and 54. The downstream end of the purifying liquid-diluting liquid supply flow path 58 is connected to one port of the flow path switching valve 42.

The eluent supply section 8 is configured to supply an eluent through an eluent supply flow path 68 by the liquid feed pump 66. The downstream end of the eluent flow path 68 is connected to one port of the flow path switching valve 40. In the embodiment, the eluent supply section 8 supplies only one type of solvent as an eluent, but it may be configured in such a way that the type of eluent can be changed.

The fraction collector 10 includes a collection flow path 72 whose downstream end is opened. A detector 74 and a flow path selection valve 76 are provided on the collection flow path 72. The detector 74 is for detecting sample components in the liquid flowing through the collection flow path 72, and it is configured in such a way that the components detected by the detector 74 are fractionated and collected in collection containers 78 respectively by dropping the components from the downstream end of the collection flow path 72. The upstream end of the collection flow path 72 is connected to one port of the flow path switching valve 40.

The flow path switching section 12 is configured by the flow path switching valves 40, 42, and 44. Each of the flow path switching valves 40 and 42 include six ports provided on the same circumference, which is a six-way valve that switches the connection between adjacent ports.

The analysis flow path 24, a flow path joining drain flow path 60, a flow path 73 leading to one port of the flow path switching valve 42, the eluent supply flow path 68, a flow path 70 leading to the common port of the switching valve 48 of the trap section 4, and the collection flow path 72 are connected to the respective ports of the flow path switching valve 40, respectively. The flow path switching valve 40 is switched to either a state where the analysis flow path 24 and the flow path joining drain flow path 60, the flow path 73 and the collection flow path 72, and the eluent supply flow path 68 and the flow path 70 are connected, respectively (state of FIG. 2), or a state where the analysis flow path 24 and the flow path 73, the eluent supply flow path 68 and the collection flow path 72, and the flow path 70 and the flow path joining drain flow path 60 are connected, respectively (states of FIGS. 4 and 5).

The purifying liquid-diluting liquid supply flow path 58, a drain flow path 60, a flow path joining the drain flow path 60, a flow path 73, a flow path 71 leading to the common port of the switching valve 46 of trap section 4, and a flow path 62 leading to the common port of the switching valve 44 are connected to the respective ports of the flow path switching valve 42, respectively. The flow path switching valve 42 is switched to either a state where the purifying liquid-diluting liquid supply flow path 58 and the drain flow path 60, the flow path 73 and the flow path joining the drain flow path 60, and the flow path 62 and the flow path 71 are connected, respectively (state of FIG. 2), or a state where the purifying liquid-diluting liquid supply flow path 58 and the flow path 62, and the flow path 71 and the flow path 73 are connected, respectively (states of FIGS. 4 to 6).

The switching valve 44 includes a common port connected to one port of the switching valve 42 via the flow path 62, and a plurality of selection ports provided around the common port, and it is configured to connect the common port to any one selection port that is selectively switched to. Flow path 64, leading to each flow path in which a trap column 45 of the trap section 4 is provided, is connected to the selection ports of the switching valve 44. The switching valve 44 is for selectively switching the trap column 45 that supplies a purifying liquid or a diluting liquid from the purifying liquid-diluting liquid supply section 6.

Figure 3:
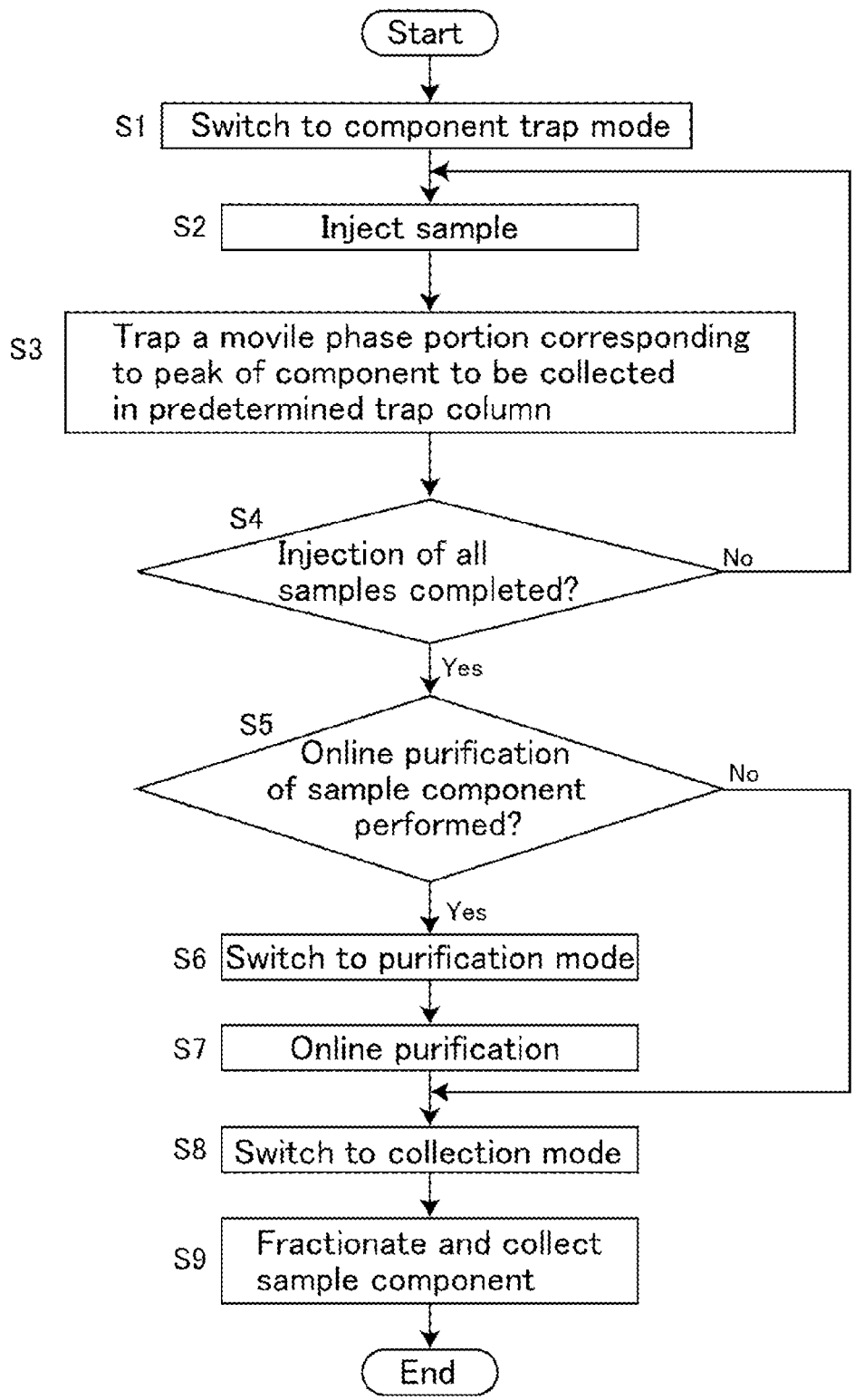
FIG. 3 is a flowchart illustrating one example of the operations of the embodiment.

One example of the operation of the preparative liquid chromatograph illustrated in FIG. 2 will be described with reference to the flowchart of FIG. 3 and the flow path diagrams of FIGS. 4 to 6.

Figure 4:
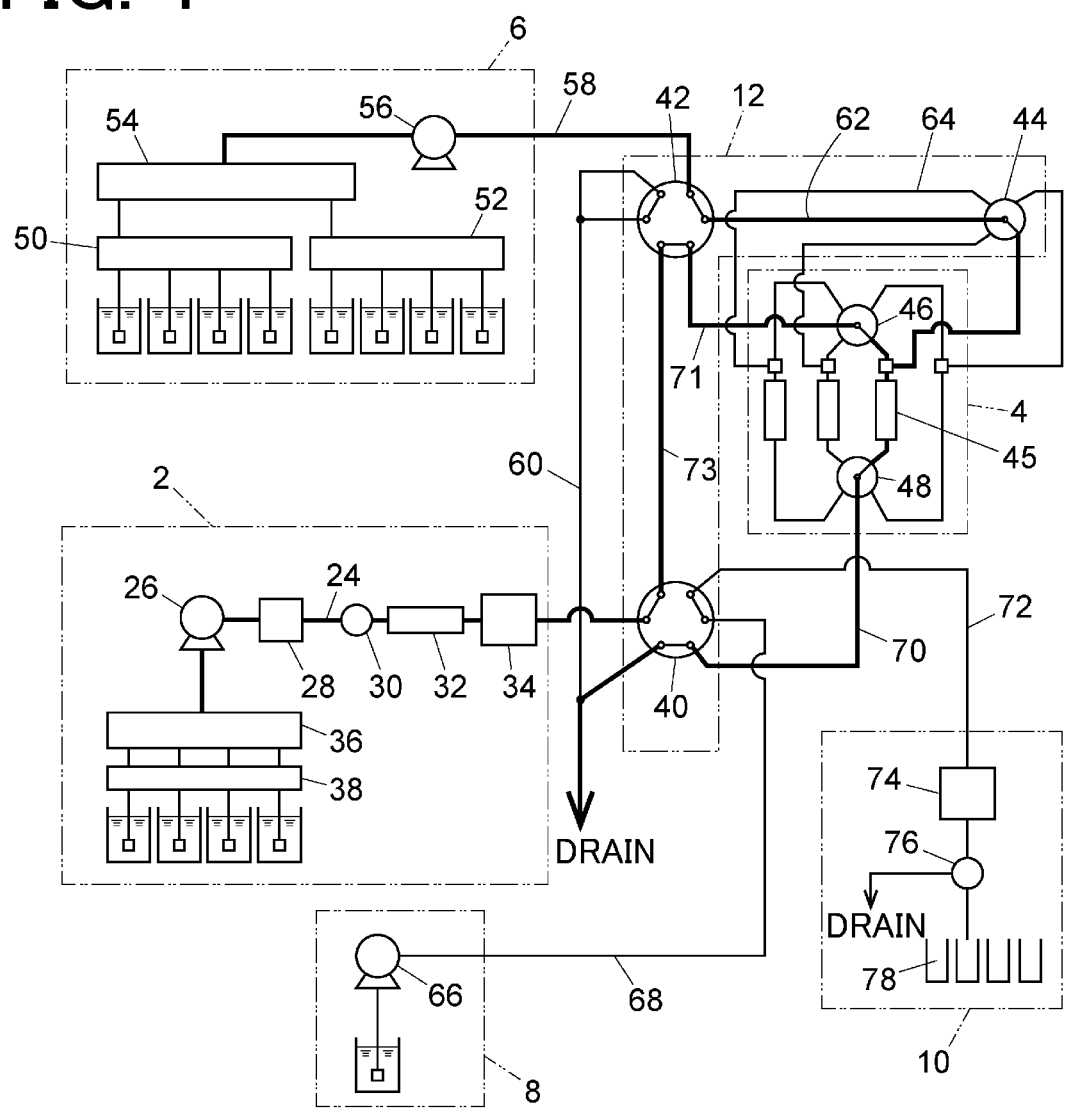
FIG. 4 is a flow path configuration diagram for explaining a state at the time of a component trap operation of the embodiment.

First, the flow path switching section 12 is switched to the component trap mode (step S1), as illustrated in FIG. 4, and the component trap operation is performed. In the component trap mode, the analysis flow path 24 and the flow path 73, the flow path 73 and the flow path 71, and the flow path 70 and the flow path joining the drain flow path 60 are connected, respectively. In this state, when a sample is injected into the analysis flow path 24 by the sample injection part 30 (step S2), the sample is transported to the separation column 32 by a mobile phase fed by the liquid feed pump 26, and is separated in time into individual components. The components separated in the separation column 32 are detected by the detector 34, and the components that passed through the detector 34 are introduced into the trap section 4 via the flow path 73 and the flow path 71.

In trap section 4, the operations of the switching valves 46 and 48 are controlled based on a detection signal of the detector 34, so that desired components are trapped in predetermined trap columns 45 (step S3). When the same samples are injected multiple times into the analysis flow path 24 (step S5), the above operation is repeated until all the sample injections are completed, and the same components separated in the separation columns 32 are collectively trapped in the common trap column 45. In this component trap operation, a diluting liquid is supplied from the purifying liquid-diluting liquid supply section 6, as needed. The diluting liquid from the purifying liquid-diluting liquid supply section 6 joins the solution containing the components separated in the separation column 24 on the upstream of the trap column 45.

Figure 5:
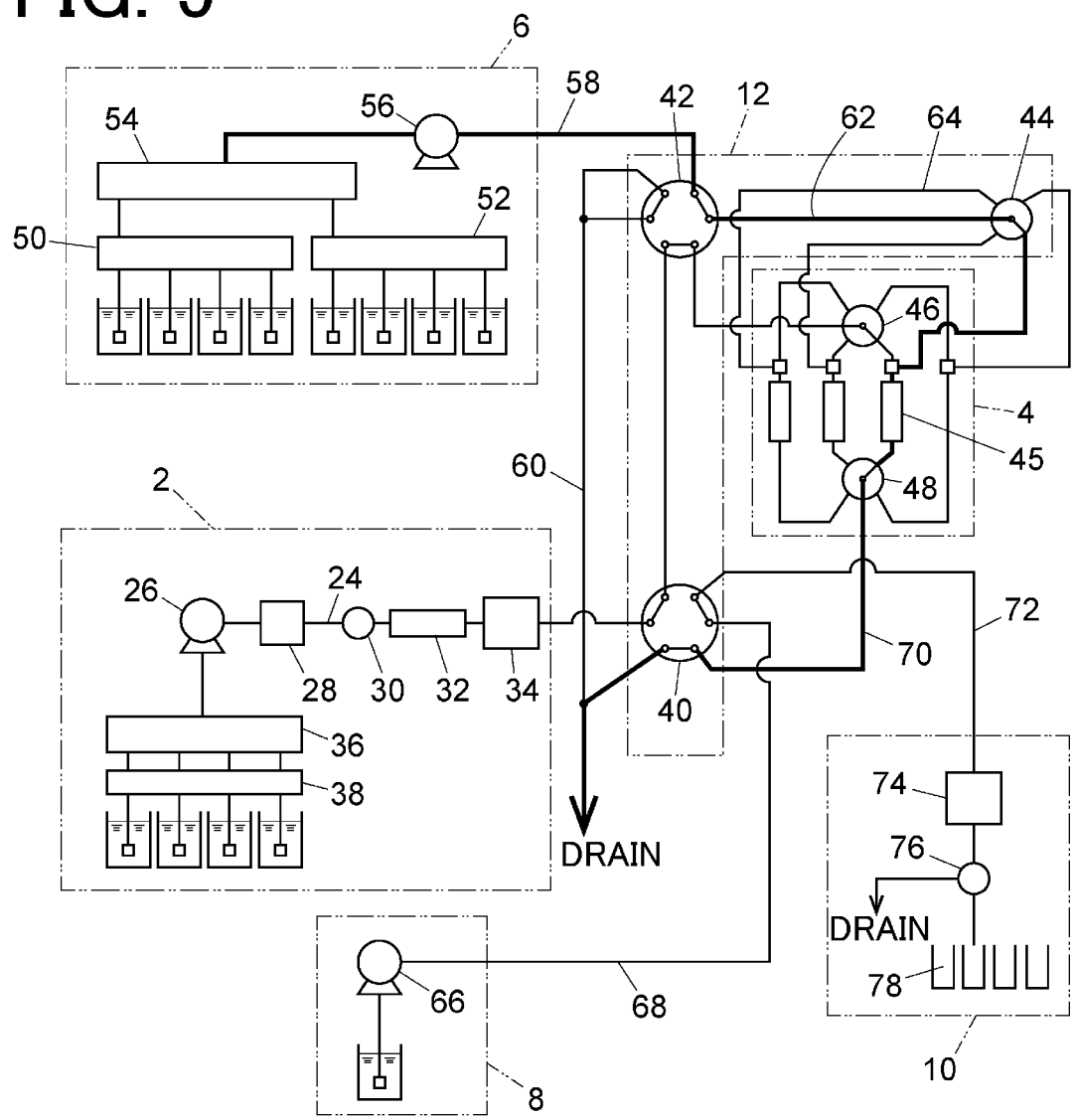
FIG. 5 is a flow path configuration diagram for explaining a state at the time of a purification operation of the embodiment.

When the purification operation for the components trapped in the trap columns 45 is performed (step S5), the flow path switching section 12 is switched to the purification mode, as illustrated in FIG. 5. In this embodiment, the flow path configuration in the above component trap mode and that in the purification mode are the same as each other. In this state, a purifying liquid is fed from the purifying liquid-diluting liquid supply section 6, which flows through the trap column 45 in which a sample component to be purified is trapped, and is discharged to drain (step S6). The type of the purifying liquid to be used in this purification operation can be set in advance by a user in accordance with the type of the solvent (the mobile phase derived components) used as a mobile phase in the liquid chromatograph section 2. Alternatively, it may be configured in such a way that the type of the purifying liquid to be used in the purification operation is automatically determined by the control section 14 (FIG. 1) in accordance with the type of the solvent (the mobile phase derived components) used as a mobile phase in the liquid chromatograph section 2.

When the mobile phase derived components is TFA, ammonia water can be used as the purifying liquid to be used in the purification operation.

Figure 6:
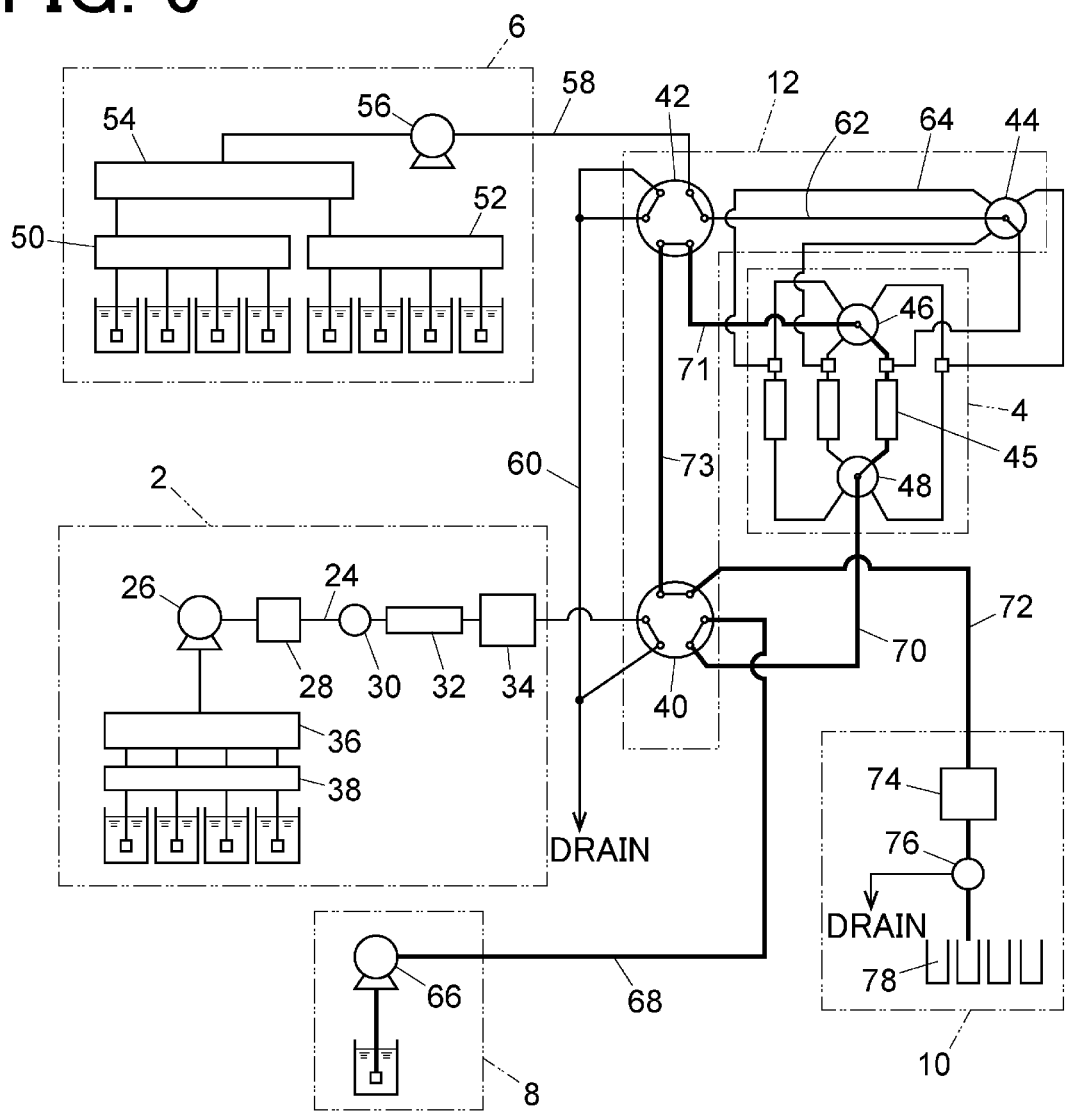
FIG. 6 is a flow path configuration diagram for explaining a state at the time of a collection operation of the embodiment.

When the above purification operation is not performed, or when the above purification operation is completed, the flow path switching section 12 is switched to the collection mode, as illustrated in FIG. 6, and the collection operation is performed (step S8). When the flow path switching section 12 is switched to the collection mode, the eluent supply flow path 68 and the flow path 70, the flow path 71 and the flow path 73, and the flow path 73 and the collection flow paths 72 are connected, respectively. An eluent is fed from the eluent supply section 8 in this state, and the eluent is supplied to the trap column 45 via the eluent supply flow path 68 and the flow path 70, so that the components trapped in the trap column 45 are eluted. After flowing through the flow path 71, the flow path 73, and the collection flow path 72, the components eluted from the trap column 45 are detected by the detector 74 and are fractionated and collected in predetermined collection container 78 (step S9).

A computer program may be configured to cause the preparative liquid chromatograph to perform the steps of the method by being executed by a computer.

It is preferable that the eluent to be used in the above collection operation is a solution containing a large amount (e.g., concentration 90%) of an organic solvent that has a boiling point lower than water, such as acetonitrile (the boiling point of which is about 82° C.). Thereby, drying of the components collected in the collection container 78 becomes easy. Moreover, elution power from the trap column 45 by the eluent may be adjusted by using an organic solvent such as ethanol or isopropanol.

The trap section 4 includes a plurality of trap columns 45 in the above embodiment, but the present invention is not limited to this, as long as at least one trap column 45 is provided. For example, when there is only one sample component to be collected, only one trap column 45 should be provided.

The invention claimed is:

1. A method for collecting components individually using a preparative liquid chromatograph, wherein the preparative liquid chromatograph comprises an injector for injecting a sample, a separation column for separating the injected sample into a plurality of components, a trap column each component for trapping the plurality of components separated by the separation column, and a collector for collecting the eluate from the trap column for each component, the method comprises:

a flowing step of flowing a mobile phase including trifluoroacetic acid;

an injection step of performing a plurality of injections of the same sample into the mobile phase using the injector;

a separating step of separating the injected sample injected by the plurality of the injections into a plurality of components using the separation column;

a trapping step of trapping the plurality of components and trifluoroacetic acid by the trap column for each component so that the same components are collectively trapped in the trap column for each component;

a purifying step of purifying the components in the trap column by supplying a purifying liquid, which is a liquid for removing the trifluoroacetic acid from the components, to the trap column for each component after the trapping step, and a collecting step of leading the purified components from the trap column for each component to the collector by supplying an eluent to the trap column for each component after the purifying step.

2. The method according to claim 1, wherein the purifying liquid is ammonia water.

* * * * *